UNITED STATES PATENT OFFICE.

RAMÓN BONASTRE LLOPART, OF CORDOBA, ARGENTINA.

PRODUCTION OF ZINC SULFATE.

1,142,795. Specification of Letters Patent. Patented June 15, 1915.

No Drawing. Application filed April 2, 1915. Serial No. 18,818.

*To all whom it may concern:*

Be it known that I, RAMÓN BONASTRE LLOPART, a subject of the King of Spain, residing at Cordoba, Province of Cordoba, Argentina, have invented a new and useful Improvement in the Production of Zinc Sulfate; and I do hereby declare the following to be a full, clear, and exact description of the same.

This invention relates to a process for producing zinc sulfate or other zinc compounds from zinc ores.

The object of the invention is to convert zinc blende into zinc sulfate without the use of sulfuric acid, and to effect this conversion with a high percentage yield.

Hitherto, I believe, it has not been possible to convert more than 30 to 35% of the zinc in the zinc blende into zinc sulfate by smelting.

To accomplish the desired end I treat the zinc blende as follows:—With the zinc blende I mix a suitable quantity of zinc oxid, or some substance such as calamin or zinc carbonate containing sufficient zinc and oxygen. The zinc blende used should contain substantially enough sulfur in the form of other sulfids to form zinc sulfate by a reaction between the blende and the oxid or calamin. Should the ore not contain enough sulfur as just stated, free sulfur may also be mixed with the blende to supply this deficiency. In zinc blende containing also considerable percentages of sulfid of iron or other non-zincic sulfids, sufficient sulfur is obtained from the sulfids to combine with the zinc oxid, carbonate or calamin and oxygen to form zinc sulfate. The proportion of zinc oxid, carbonate or calamin to the blende must therefore be regulated according to the percentage of sulfur in the blende. For example, with 100 lbs. of impure zinc blende containing 50 to 60% of zinc sulfid and 20 to 30% of sulfid of iron, may be mixed 15 to 25 lbs. of zinc oxid or a quantity of calamin or carbonate containing at least as much of zinc as the oxid. The 7½ to 11 lbs. of sulfur contained in the sulfid of iron will furnish sulfur to combine with the oxid of zinc to form zinc sulfate. Such a mixture of zinc blende and zinc oxid is then roasted in a furnace of any suitable description which is not hermetically sealed but into which the air can enter without producing strong currents of air through the furnace. This mixture is roasted in such a furnace at about 400° to 500° C., and with the result that substantially the following reaction occurs:

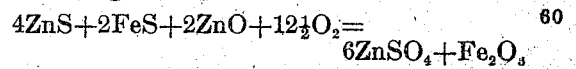

$$4ZnS + 2FeS + 2ZnO + 12\tfrac{1}{2}O_2 = 6ZnSO_4 + Fe_2O_3$$

As this reaction indicates, the sulfid of iron or other non-zincic sulfids are converted into oxids, furnishing some sulfur to combine with zinc oxid to form zinc sulfate. Oxygen, moreover, is brought into the reaction, being furnished by the air which has access to the furnace, so that the total quantity of zinc, (both as sulfid and as oxid) in the mixture is converted into zinc sulfate. It may be that zinc oxid acts as a carrier of the oxygen to the sulfid, for I find that it is possible to thus convert zinc blende into zinc sulfate at the comparatively low temperature stated.

It is known that zinc sulfid and zinc oxid form a compound ZnS.ZnO at low temperatures which readily reacts with reagents, and it may be that the formation of such a compound accounts for the herein disclosed novel improvement in processes of smelting zinc ores.

The roasting is continued until substantially all of the zinc oxid and sulfid have been converted into zinc sulfate. The resulting mixture of zinc sulfate and other substances, such as oxids, is agitated in water preferably in hot water to leach out the zinc sulfate, and the resulting aqueous solution is decanted and may then be further treated to remove impurities if necessary or thought desirable.

The zinc oxid used may be prepared in any suitable way. For instance, I first oxidize the zinc blende, (which may be either comparatively pure zinc sulfid or may be contaminated with larger or smaller amounts of other sulfids or other impurities) in a roasting furnace at about 800° to 900° C., and until the zinc sulfid has been substantially all converted into zinc oxid.

If instead of using zinc oxid, obtained by the preliminary roasting above described, I mix calamin or zinc carbonate with a suitable amount of fresh zinc blende as above described, the carbonate is decomposed into carbon dioxid and zinc oxid; and the latter furnishes the zinc oxid required for the above reaction and effects above described.

The novel process herein described has general application in the production of zinc sulfate, but is particularly suitable in the production of pure stable zinc sulfate used to react with barium sulfid in the production of inalterable white lithopone.

I claim as my invention:—

1. The method of producing zinc sulfate, which consists in mixing a blende comprising zinc sulfid and sulfid of iron with substances containing zinc and oxygen, heating them to 400° to 500° C. in air free from strong currents.

2. The method of producing zinc sulfate which consists in heating a mixture of a zinc carbonate with a blende containing zinc sulfid and a sulfid of iron to a temperature of 400° to 500° in an oxidizing atmosphere.

3. The method of producing zinc sulfate which consists in mixing zinc sulfid and zinc oxid with sulfur and heating the mixture to 400° to 500° C. in an oxidizing atmosphere.

4. The method of producing zinc sulfate, which consists in mixing a blende comprising zinc sulfid and sulfid of iron with calamin or zinc carbonate, and heating to 400° to 500° C. in air free from strong currents.

5. The method of producing zinc sulfate, which consists in heating a mixture of zinc sulfid, sulfid of iron and zinc oxid in an oxidizing atmosphere at a temperature below low red heat.

6. The method of producing zinc sulfate, which consists in heating a mixture of zinc sulfid and sulfur in another form with zinc oxid in an oxidizing atmosphere at a temperature below red heat.

RAMÓN BONASTRE LLOPART.